(12) United States Patent
Casavant et al.

(10) Patent No.: US 10,820,028 B1
(45) Date of Patent: *Oct. 27, 2020

(54) METHOD AND SYSTEM FOR DETECTING UNAUTHORIZED USE OF A SET TOP BOX USING SATELLITE SIGNAL IDENTIFICATION

(71) Applicant: The DIRECTV Group, Inc., El Segundo, CA (US)

(72) Inventors: Scott D. Casavant, Germantown, MD (US); Sean S. Lee, Potomac, MD (US); Kuriacose Joseph, Gaithersburg, MD (US); John L. Norin, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,619

(22) Filed: Jan. 4, 2019

Related U.S. Application Data

(60) Continuation of application No. 15/581,355, filed on Apr. 28, 2017, now Pat. No. 10,271,081, which is a division of application No. 13/413,806, filed on Mar. 7, 2012, now abandoned.

(51) Int. Cl.
| | |
|---|---|
| *H04N 21/258* | (2011.01) |
| *H04N 7/10* | (2006.01) |
| *H04H 60/51* | (2008.01) |
| *H04N 21/2543* | (2011.01) |
| *H04N 21/61* | (2011.01) |
| *H04H 60/16* | (2008.01) |

(52) U.S. Cl.
CPC ...... *H04N 21/25816* (2013.01); *H04H 60/16* (2013.01); *H04H 60/51* (2013.01); *H04N 7/10* (2013.01); *H04N 21/2543* (2013.01); *H04N 21/25841* (2013.01); *H04N 21/6112* (2013.01); *H04N 21/6143* (2013.01)

(58) Field of Classification Search
None
See application file for complete search history.

(56) References Cited

U.S. PATENT DOCUMENTS

| | | | |
|---|---|---|---|
| 6,567,662 B1 | 5/2003 | Swanchara, III et al. | |
| 8,214,465 B2 * | 7/2012 | Black | H04L 69/329 709/220 |
| 8,387,084 B1 * | 2/2013 | Klappert | G06F 21/105 380/258 |

(Continued)

FOREIGN PATENT DOCUMENTS

EP          2312767 A1       4/2011

*Primary Examiner* — Ricky Chin
(74) *Attorney, Agent, or Firm* — Guntin & Gust, PLC; Dana B. LeMoine

(57) ABSTRACT

A user device and method comprising a satellite signal determination module receiving a satellite signal from a satellite comprising a first satellite signal identifier, a memory storing an expected satellite signal identifier for an authorized location of the user device, a comparison module comparing the first satellite signal identifier to the expected satellite signal identifier to identify the first satellite signal as unexpected when the first satellite signal is not the expected satellite signal and a disable module disabling the user device from processing satellite signals in response to comparing.

15 Claims, 6 Drawing Sheets

(56) References Cited

U.S. PATENT DOCUMENTS

| | | |
|---|---|---|
| 8,589,580 B2 | 11/2013 | Gutarin et al. |
| 8,756,636 B1 | 6/2014 | Wasden et al. |
| 10,271,081 B2* | 4/2019 | Casavant ............... H04H 60/16 |
| 2001/0004595 A1 | 6/2001 | Dent |
| 2002/0023010 A1 | 2/2002 | Rittmaster et al. |
| 2002/0107855 A1 | 8/2002 | Nishi |
| 2003/0177504 A1 | 9/2003 | Paulo et al. |
| 2004/0172647 A1 | 9/2004 | Godwin |
| 2004/0203768 A1 | 10/2004 | Ylitalo et al. |
| 2006/0287915 A1 | 12/2006 | Boulet et al. |
| 2008/0034114 A1 | 2/2008 | Ducey et al. |
| 2008/0136969 A1* | 6/2008 | Chang ................... H04N 7/163 348/557 |
| 2008/0155619 A1 | 6/2008 | Constantinof |
| 2009/0125950 A1 | 5/2009 | Chaudhry et al. |
| 2010/0115544 A1* | 5/2010 | Swenson ................ H04N 7/165 725/28 |
| 2010/0154010 A1 | 6/2010 | Chang |
| 2010/0232431 A1 | 9/2010 | Sebastian |
| 2011/0010735 A1 | 1/2011 | Newell |
| 2011/0012801 A1 | 1/2011 | Monte et al. |
| 2011/0055862 A1 | 3/2011 | Harp et al. |
| 2011/0081020 A1* | 4/2011 | Loomis .................. G01S 19/14 380/270 |
| 2011/0096243 A1* | 4/2011 | Casagrande ........... H04H 60/42 348/731 |
| 2011/0320628 A1 | 12/2011 | Gutarin et al. |
| 2012/0131611 A1* | 5/2012 | Yeap ................ H04N 21/42202 725/35 |
| 2012/0131650 A1* | 5/2012 | Gutt ................... H04B 7/18593 726/5 |
| 2012/0222089 A1* | 8/2012 | Whelan .............. H04B 7/18593 726/3 |
| 2013/0014216 A1 | 1/2013 | Lawrence et al. |
| 2015/0046952 A1 | 2/2015 | Beals |
| 2015/0189379 A1* | 7/2015 | Swenson .............. H04H 21/814 725/16 |
| 2017/0324470 A1 | 11/2017 | Roos |

* cited by examiner

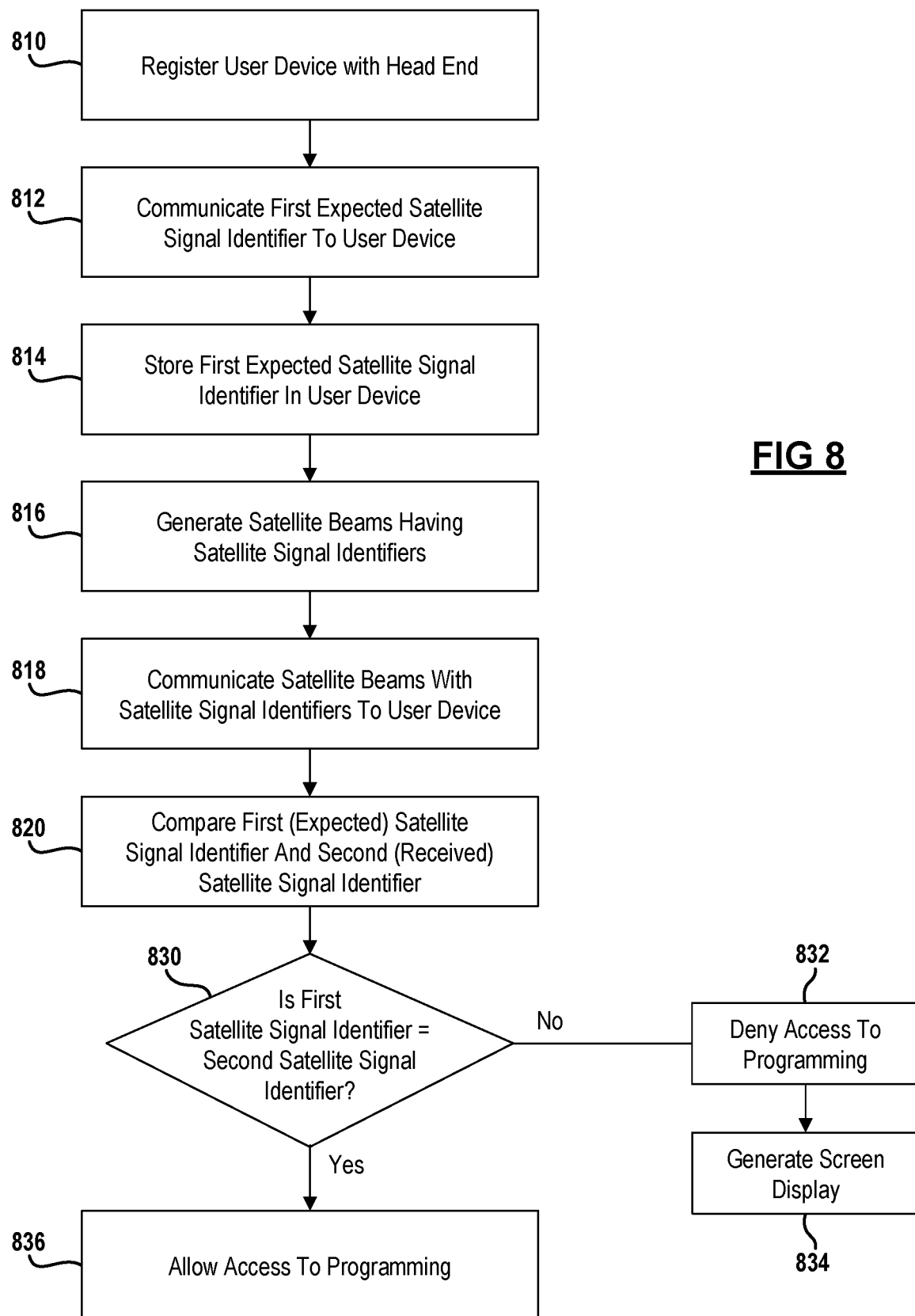

METHOD AND SYSTEM FOR DETECTING UNAUTHORIZED USE OF A SET TOP BOX USING SATELLITE SIGNAL IDENTIFICATION

CROSS-REFERENCE TO RELATED APPLICATIONS

This application is a continuation of U.S. patent application Ser. No. 13/413,806 filed on Mar. 7, 2012. The entire disclosure of the above application is incorporated herein by reference.

TECHNICAL FIELD

The present disclosure relates generally to communicating between a service provider and a user device, and, more specifically, to disabling service of a set top box based upon received satellite signal identification.

BACKGROUND

The statements in this section merely provide background information related to the present disclosure and may not constitute prior art.

Satellite programming has become increasingly popular due to the wide variety of content and services available. Typically, a set top box is configured to receive satellite programming in response to conditional access provided through the use of encryption and a conditional access module. When a consumer has proper conditional access credentials, the signals are decrypted so that the output may be viewed by the user.

Satellite television must follow various broadcasting rules set by the government. Other rules are contractually negotiated with various content providers. Such rules provide limitations for users based on geography. A satellite television provider may have rights to distribute content to a particular country such as the United States while not having authorization to provide broadcast service into adjacent countries such as Canada and Mexico. Because satellite beams do not exactly follow the borders, the satellite beams may overlap various boundaries to a certain extent. Further, geographic restrictions may be provided for various types of signals including local signals that are not to be received outside of a particular designated marketing area.

Further, providers of various equipment may not be authorized to distribute the equipment in particular geographic areas.

Preventing unauthorized use is important from a business perspective.

SUMMARY

The present disclosure provides a system and method for reducing unauthorized use of set top boxes in a particular area by comparing identifiers for received satellite beams with expected satellite signal identifiers based on user device location.

In one aspect of the disclosure, a method includes receiving a satellite signal from a satellite comprising a first satellite signal identifier, associating a second satellite signal identifier with a location of a user device, storing the second satellite signal identifier in a memory of the user device, comparing the first satellite signal identifier to the second satellite signal identifier and disabling the user device from processing satellite signals in response to comparing.

In a further aspect of the disclosure, a system for determining unintended use of a set top box includes a satellite signal determination module in the set top box that receives a satellite signal from a satellite comprising a first satellite signal identifier. A memory in the set top box stores a second satellite signal identifier for a location of the user device. The user device also includes a comparison module comparing the first satellite signal identifier to the second satellite signal identifier and a disable module disabling the user device from processing satellite signals in response to comparing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 8 is a flowchart of a method of operating the system.

DETAILED DESCRIPTION

Figure 1:
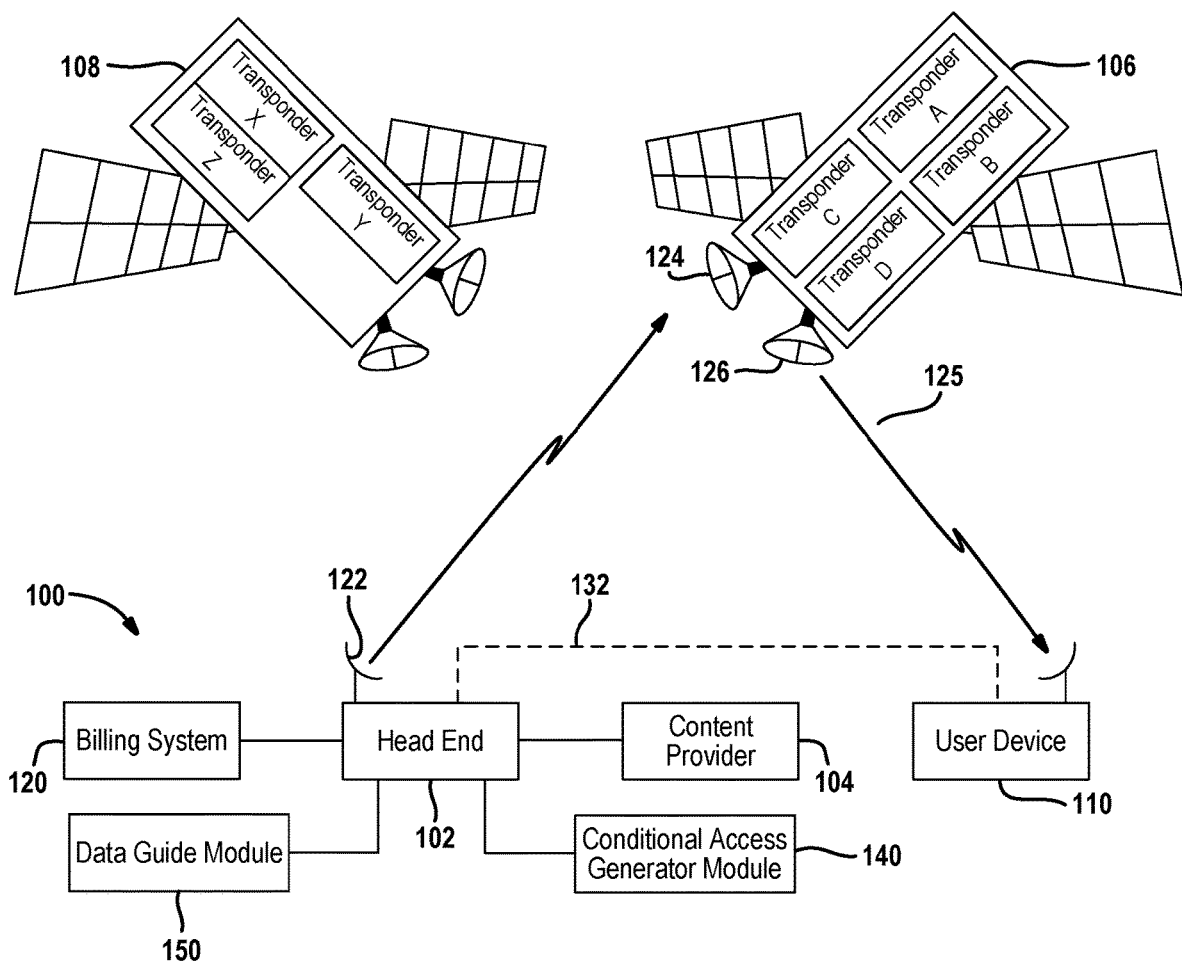
FIG. 1 is a diagrammatic representation of a satellite communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. Insert detailed description.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

The following description refers to communicating content, data, control signals, data objects and the like. The content data, control signals, and data objects are communicated electronically using electrical or optical control signals.

Referring now to FIG. 1, a content communication system 100 includes a head end 102 that is used as a processing, security and transmission source. Of course the various functions may be separated. A plurality of content providers, one of which is shown at reference numeral 104 may provide content to the head end 102 for distribution therefrom.

A first satellite 106 and a second satellite 108 may also be incorporated into the system 100. The satellites 106, 108 may be used to communicate different types of data or different portions of various content from the head end 102.

The system 100 also includes a plurality of fixed user devices 110 such as integrated receiver/decoders (IRDs), which may be referred to as set top boxes. The user devices 110 may be referred to as fixed user devices because they are typically associated with a display mounted within a home or business. Wireless communications are exchanged between the head end 102 and the user devices 110 through one or more of the satellites 106, 108. The wireless communications may take place at any suitable frequency, such as but not limited to, Ka band and/or Ku-band frequencies. The satellites 106, 108 may be located at different orbital positions and thus the angle relative to the user device 110 may be different.

The satellites 106, 108 may be a geosynchronous or geo-stationary satellite that, in turn, rebroadcast the information over broad geographical areas on the earth that include the user devices 110. The satellites may have inter-satellite communication links for relaying data between the satellites 106 and 108.

A number of transponders are illustrated in satellites 106, 108. Satellite 106 is illustrated with transponder A, transponder B, transponder C, and transponder D. Satellite 108 is illustrated with transponder X, transponder Y and transponder Z. Each transponder is used to communicate various channel signals through a beam. The transponders may be associated with a Continental United States (CONUS) beam or with a spot beam. Spot beams may be used for local-into-local service. Local-into-local service describes a service whereby local channel signals that are broadcasted in a local designated marketing area are uplinked to the satellites 106, 108. The satellites 106, 108 communicate the local channel signals through a spot beam that services a particular geographic area. Different transponders may be used to generate different spot beams. The spot beams generated by the satellite are limited in geographical scope. For example, the spot beams may be about 600 miles wide when projected onto the surface of the earth. A spot beam received in one location may not be received in another location. Thus, programming transmitted through one spot beam may not be received by customers in another location. Each spot beam and each transponder may be uniquely identified by a unique identifier as is further described below.

The head end 102 may have a billing system 120 associated therewith. In FIG. 1, the billing system 120 is illustrated as separate. However, the billing system 120 may be included within the head end 102. The billing system 120 keeps track of the various user devices and accounts. Each user device 110 has a billing address or service address associated therewith. The billing or service address is an authorized location of the user device. The service address may be a street address, a postal code, or both. The address is a location that can also be associated with a designated marketing area. Each designated marketing area may have a predetermined number of satellite transponders or spot beams associated therewith. It should be noted that the negative is also possible. The location of a user device may also have spot beams it should not receive.

The head end 102 may communicate with the satellites 106, 108 using an uplink antenna 122. The uplink antenna 122 generates a satellite uplink 123 which is received by a receiving antenna 124 on the satellite. The satellite generates a downlink 125 using a downlink antenna 126. The downlinks 125 may provide regional coverage such as for the Continental United States or provide spot beam coverage for a specific geographic location within a larger geographic area.

Various types of data such as security information, encryption-decryption information, expected satellite signal identifiers, content, or content portions may be communicated terrestrially or via the satellites 106, 108 to the set top box. A communication network 132 such as the public switched telephone network (PSTN), a terrestrial wireless system, stratospheric platform, an optical fiber, or the like may be used to terrestrially communicate with the fixed user device 110.

Data or content provided to head end 102 from the content provider 104 may be transmitted, for example, via the uplink antenna 122 to the satellites 106,108. Among other things, the example head end 102 of FIG. 1 provides program content to the user devices 110 and coordinates with the user devices 110 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140. The head end 102 may also be used to add a satellite signal identifier into the satellite signals.

Security of assets broadcast via the satellites 106, 108 may be established in a conditional access generator module 140 by applying encryption and decryption to assets or content during content processing and/or during broadcast (i.e., broadcast encryption). For example, an asset may be encrypted based upon a control word (CW) known to the head end 102 and known to the user devices 110 authorized to view and/or playback the asset. In the illustrated example communication system 100, for each asset the head end 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption. Thus, a user device may be deauthorized by not allowing a user device access to the proper control word.

The control word packet may be generated at the conditional access generator module and communicated from the head end 102 with other control data as a conditional access packet (CAP). The CAP may be used to provide tuning data, geographic location profiles that include expected satellite signal identifiers or other data.

The conditional access generator module 140 may generate a conditional access packet that includes expected satellite signal identifiers or beam identifiers that are expected to be received at the user device 110. Each designated marketing area may have associated transponders that are "in view" and thus certain transponder signals or signals with certain market identifiers may be received. The conditional access packet may thus include the satellite beam identifiers or transponder identifiers that are authorized for the user location which are to be stored within the user device 110 and used for later comparison. The conditional access generator module 140 may generate the authorized identifier signals after interaction with the billing system 120. The authorized identifiers correspond to expected signals for the user device location.

A guide data module 150 may be used to provide program guide data to the user devices 110 through the satellite 106, 108. This is done using various data objects. The guide data module 150 may also provide satellite signal identifiers for the expected satellite signal using the data object. In summary, expected satellite signal identifiers may be communicated in various ways including, but not limited to, through terrestrial networks, conditional access packets and data objects.

The user device 110 may compare the actually received satellite signal identifier with the expected satellite identifiers for the user device location. If the expected satellite signal identifiers do not correspond to the received satellite signal identifiers (from the corresponding satellite beams), the user device 110 may have been relocated to an unauthorized viewing area such as out of the country or out of the region. Also, if the received satellite signal identifiers receive signals outside of or unexpectedly, the user device may have been relocated to an unauthorized viewing area. Access to the programming provided by the satellites 106 and 108 may thus be disabled. Details of this are described in detail below.

Figure 2:
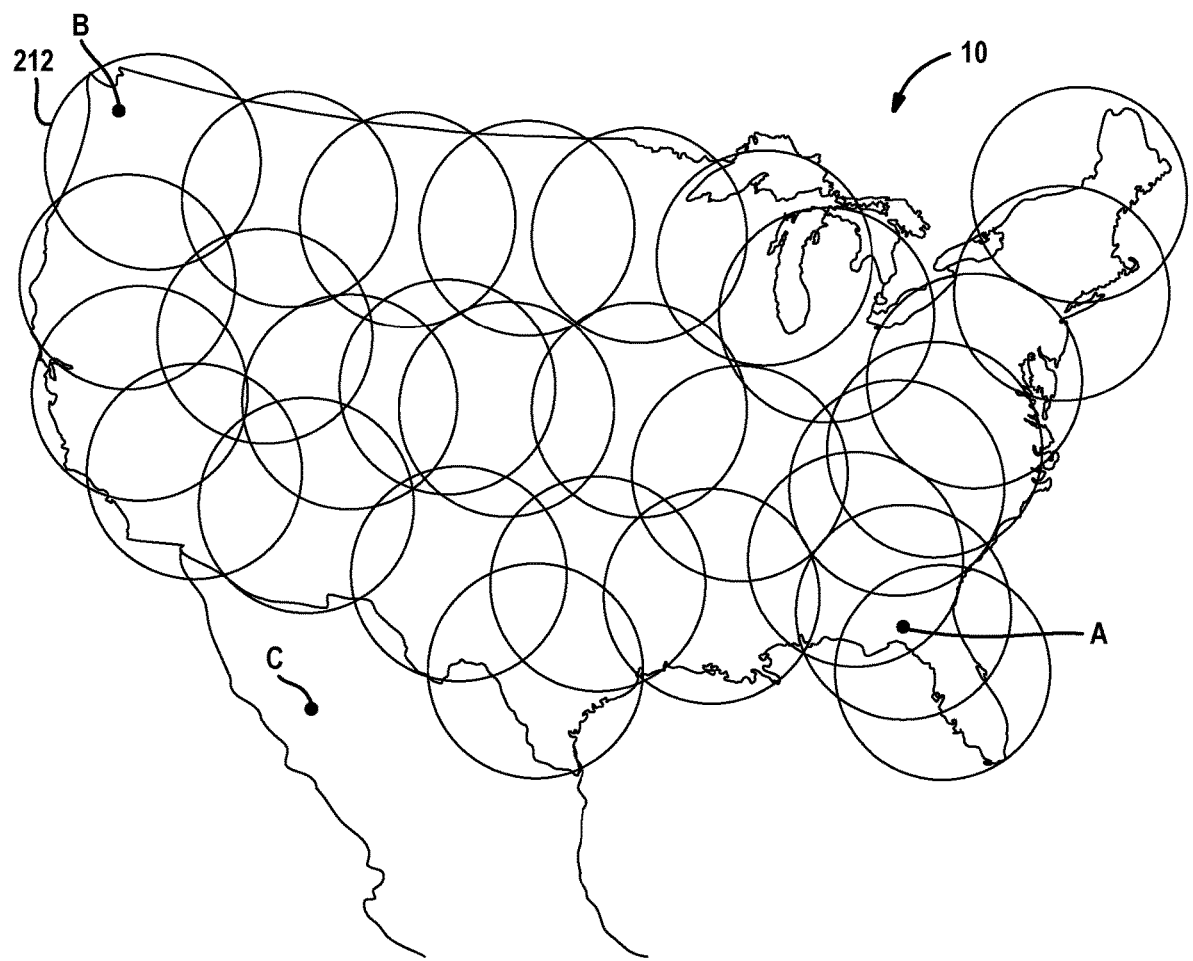
FIG. 2 is a diagrammatic layout of spot beams according to the present disclosure.

Referring now to FIG. 2, a map of the Continental United States (CONUS) 210 is illustrated. The beam pattern for spot beams 212 is overlapping to allow coverage in various areas. Each spot beam 212 may have a satellite signal identifier such as a market identifier or unique transponder identifier associated therewith. Each transponder, as mentioned above, may have a transponder identifier or other type of satellite beam identifier associated therewith. In some locations the spot beams 212 overlap and thus signals from more than one beam may be received at a user device in different positions.

Locations throughout the country may have unique combinations of received satellite signals. Also, locations through the country may have spot beams that are not accessible.

Location A, for example, may receive signals from transponder A, B, C and not from transponders X, Y and Z. Location A may be located in three different spot beams or multiple numbers of spot beams. Location B is located in only one spot beam and may receive signals from transponders A, B, X, Y and not from transponders C and Z. Location C corresponds to Mexico or Canada and is in an unauthorized area for signals originating from the United States. If a user device was authorized in location A, signals from transponders A, B and C should all be received. Signals from transponders A, B, C, X, Y and Z should not be received at location C. This may indicate that the user device in location C has been moved from location A and is thus in an authorized location.

Figure 3:
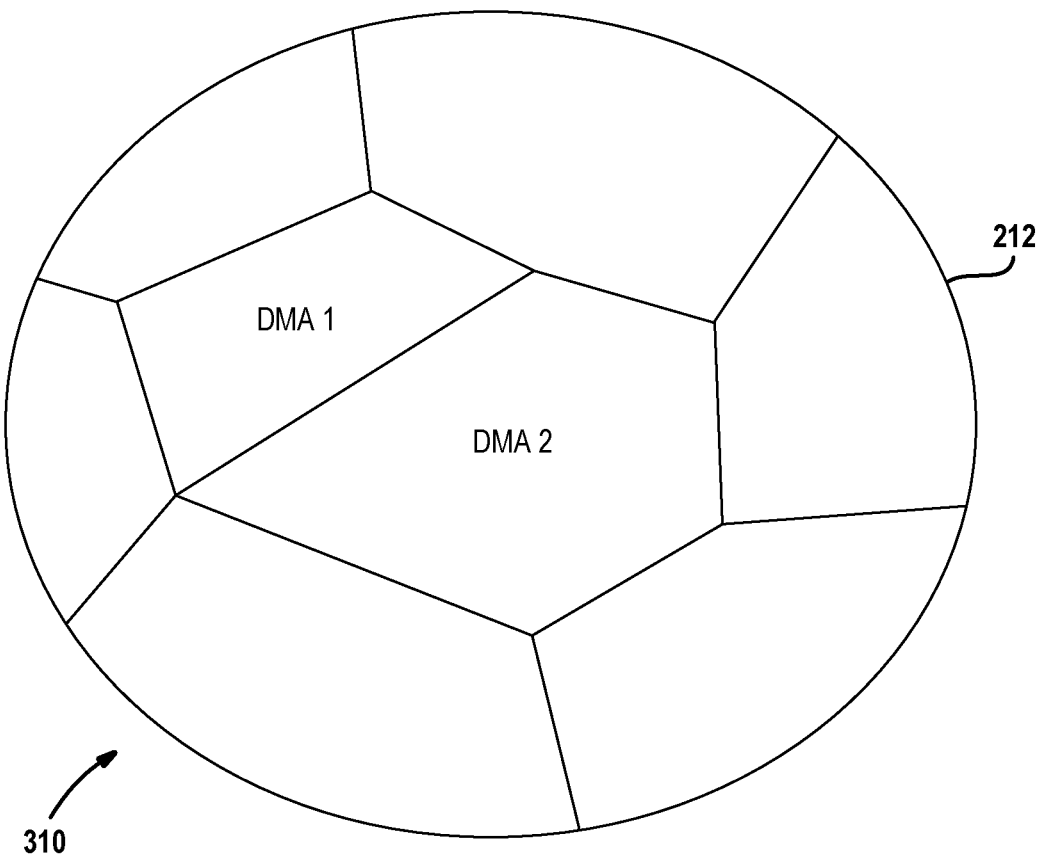
FIG. 3 is a detailed view of a spot beam having different designated marketing areas.

Referring now to FIG. 3, one example of a spot beam 212 is illustrated with a geographical region on the ground 310. The geographical region on the ground may include a first designated marketing area DMA1 and a second designated marketing area DMA2. A designated marketing area is a geographic area (closed polygon) that has fixed boundaries on the surface of the earth. The geographic area of the DMA may correspond to postal codes, county or state boundaries. Designated marketing areas may not overlap. Designating marketing areas are used to determine the proper local signals that are authorized to be received at a user-receiving device. As was illustrated in FIG. 2, a spot beam may extend over a wide geographic region. The wide geographic region covered by the spot beam may have transmitted signals originating from designated marketing areas not of interest to a particular user device. For example, a user in Detroit could receive signals from Pittsburgh local channels because they are in the same spot beam. However, most viewers in the Detroit marketing area may have little or no interest in local Pittsburgh programming.

As mentioned above, each designated marketing area may be "in view" of various transponder signals or spot beams generated by the satellites 106, 108. User devices 110 within the designated marketing area may thus be provided a list of transponders or other types of beam identifiers that are able to be received. Further, lists of transponder signals or spot beams that are unable to be received may also be communicated to the user device.

Figure 4:
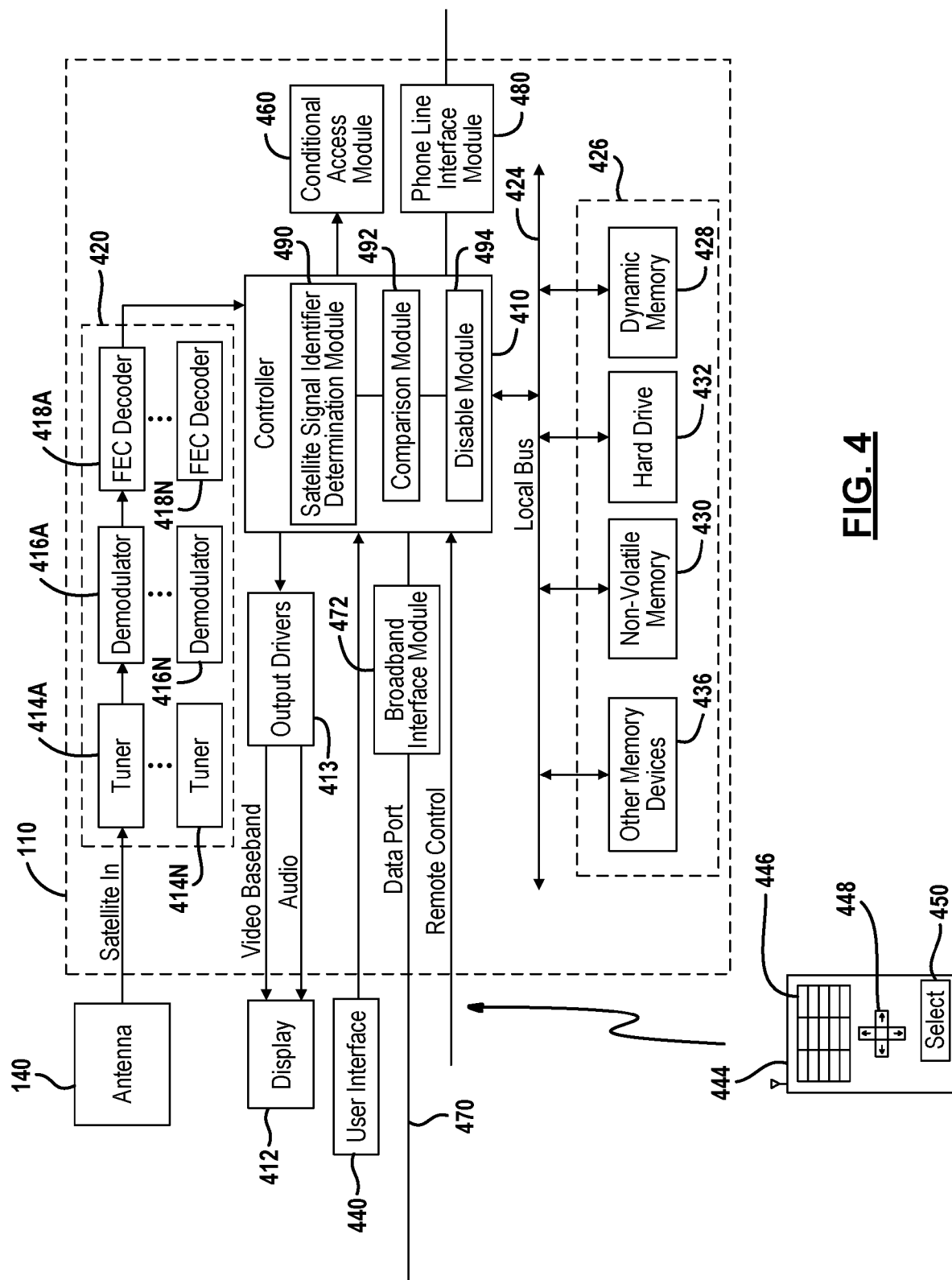
FIG. 4 is a block diagrammatic view of a set top box formed according to the present disclosure.

Referring now to FIG. 4, a user device 110 is illustrated. The fixed user device 110 may include the fixed antenna 140. The user device 110 may include a controller 410. The controller 410 may control various operations as will be described below. The user device 110 may be in communication with a display 412 through output drivers 413. The output drivers 413 may generate desired audio and video output formats suitable for the particular display 412.

The controller 410 may be a general processor such as a microprocessor. The controller 410 may be used to coordinate the control and the functions of the user device. These functions may include the functions of a receiving circuit 420. The receiving circuit 420 may include a tuner 414, a demodulator 416, a forward error correction (FEC) decoder 418 and any buffers or other functions. More than one tuner, demodulator and FEC decoder may be provided as indicated by the reference numerals "A" and "N". One constructed embodiment may include four tuners, demodulators and decoders, although various numbers of tuners, demodulators and decoders may be provided depending upon the system requirements. The tuner 414 receives the signal or data from the broadcast channel. The signal may include programming content or different types of data including program guide data. The demodulator 416 demodulates the signal to form a demodulated signal or demodulated data. The decoder 418 decodes the demodulated signal to form a decoded data or decoded signal.

The controller 410 may also be coupled to a local bus 424. The local bus 424 may be in communication with a memory module 426. The memory 426 may be used for storing expected satellite signal identifiers for the authorized location. The memory may include a dynamic memory 428, such as random access memory (RAM) which changes often and whose contents may be lost upon the interruption of power or boot up. The bus 424 may also be coupled to a non-volatile memory 430. One example of a non-volatile memory is an electrically erasable programmable read only memory (EEPROM). One specific type of EEPROM is flash memory. Flash memory is suitable since it is sectored into blocks of data that may be individually erased and rewritten.

A hard drive 432 may also be in communication with the local bus 424. The hard drive 432 may act as a digital video recorder for storing video and storing various data and various content. The hard drive may also be interchangeable with another memory device with a large capacity.

Other memory devices 436 may also be coupled to the local bus 424. The other memory devices may include other types of dynamic memory, non-volatile memory, or may include removable memory devices. The display 412 may be changed under the controller 410 in response to data in the dynamic memory 428 or non-volatile memory 430.

The various data stored in the memory module 426 may include, but is not limited to, metadata such as titles, actors, directors, descriptions, posters, identifiers, availability start times, availability end times, pricing data, timing data, program guide data, internal data regarding tuning, search recording and watching recorded content, a receiver identifier, a conditional access module identifier, expected satellite signal identifiers or transponder identifiers for the user device location, satellite signal identifiers not capable of being received at the user device location, and various other types of data.

The controller 410 may also be coupled to a user interface 440. The user interface 440 may be various types of user interfaces such as a keyboard, push buttons, a touch screen, a voice activated interface, or the like. The user interface 440 may be used to select a channel, select information, change the volume, change the display appearance, or other functions. The user interface 440 may be used in addition to a remote control device 444. The remote control device 444 may include a keypad 446, an arrow keypad 448, and a select button 450. Inputs to the user device may be provided by the remote control device or through the user interface 440.

A conditional access card module 460 (CAM) may also be incorporated into the user device. Access cards, such as a conditional access module, may be found in DIRECTV® units. The conditional access card module 460 may provide conditional access to various channels and wireless signals generated by the system. The conditional access card module 460 may control the decryption of program content. Not having an access card or not having an up-to-date conditional access card module 460 may prevent the user from receiving or displaying various video and other content from the system.

The controller 410 may also be in communication with a data port 470. The data port 470 may be a broadband data port that is coupled to the controller 410 through a broadband interface module 472. The broadband interface module 472 may allow wireless or wired communication between external devices with the controller 410. The controller 410 through the broadband interface module 472 may communicate with the internet and various systems such as the head end 102 of the content communication system. Callback signals may be provided through the broadband interface module 472 from the controller 410. The call back signals may include weather or signal strength logs.

The controller 410 may also be in communication with a phone link interface module 480. The phone link interface module 480 may couple the user device 110 to a public switched telephone network (PSTN). The user device 110 may generate callback signals to the head end through the phone interface module 480.

Callback signals may be provided through the broadband interface module 472, the phone interface module 480 or both. A callback signal may be generated through the broadband interface module 72 or the phone line interface module 480 for communicating data therethrough.

The controller 410 may include a satellite signal identifier determination module 490. The satellite signal identifier determination module 490 may determine a satellite signal identifier such as a market identifier associated with a satellite signal or identifier signals for a spot beam. The satellite signal identifier determination module 490 may also determine identifier signals received from various transponders from one or more satellites. The identifiers, such as the market identifier or the beam identifier, are determined from received beams or signals. Essentially, the satellite signals received include satellite signal identifiers that may correspond to transponders or other market identifiers.

The satellite signal identifier determination module 490 may be activated at various times to monitor the received satellite signals and determine unauthorized use. For example, upon powering the user device, the satellite signal identifier determination module 490 may receive the satellite signal or signal identifiers. Monitoring may also take place on a schedule or on a periodic basis.

The controller 410 may also include a comparison module 492. The comparison module 492 receives the satellite signal identifiers from the satellite signal identifier determination module 490. The comparison module 492 compares the received satellite signal identifiers with the expected satellite signal identifiers stored within the memory 426. A comparison of received identifiers with unauthorized spot beams may also be determined. That is, unexpected beams may indicate an unauthorized position of the user device.

If the received satellite signal identifier and the stored satellite signal identifiers do not correspond sufficiently or if unauthorized beams are received, the disable module 494 may be used to disable the user device. The disable module 494 may prevent the user device and the components therein from processing the satellite signals such as by preventing demodulating or decoding the satellite signals. The disable module 494 may also be used to generate a screen display indicating the set top box has been displaced since the location of the set top box does not correspond to the registered location.

Figure 5:
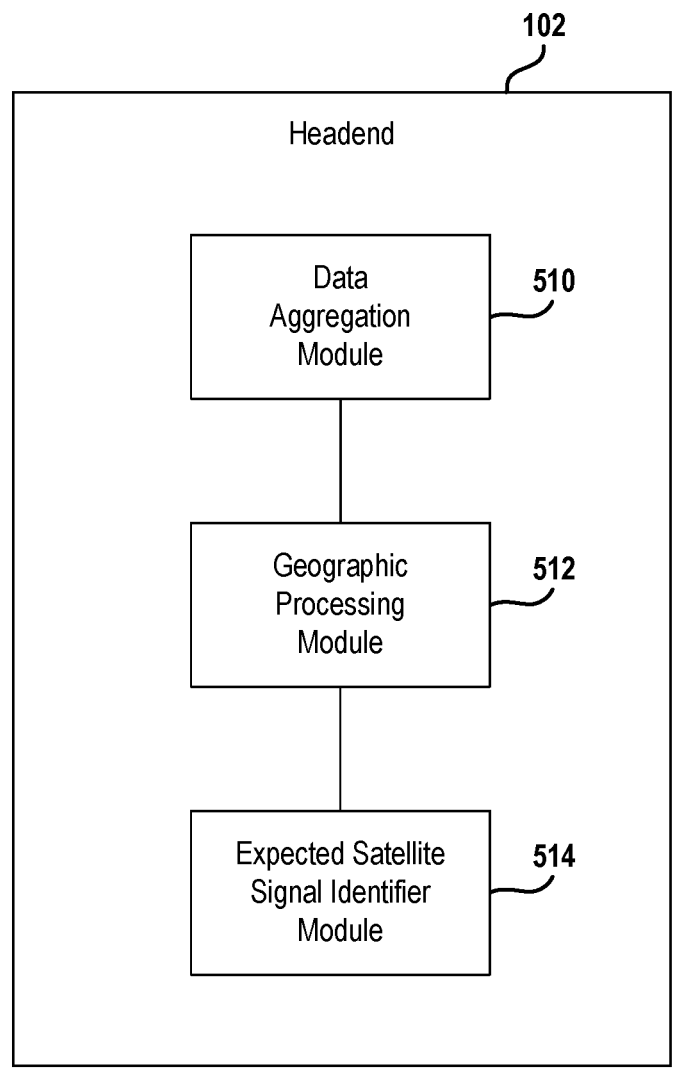
FIG. 5 is a block diagrammatic view of a content processing system according to the present disclosure.

Referring now to FIG. 5, a simplified block diagrammatic view of the head end 102 is set forth. The head end 102 may include a data aggregation module 510. The data aggregation module 510 may be used to obtain data corresponding to locations of the user devices. The data aggregation module 510 may include the satellite signal identifiers that may be received at a particular designated marketing area. Thus, the data aggregation module 510 may be used to generate a chart or database that includes the expected satellite signal identifiers for various designated marketing areas.

A geographic processing module 512 processes the data from the data aggregation module 510 and when a particular user device is activated into the system, generates a conditional access packet data object or other communication signal at an expected satellite signal identifier module 514. The communication signal sent to the user device from the head end 102 may include the expected satellite signal identifiers for the designated marketing area. The data may be communicated to the set top box in a manner that provides some type of abstraction to prevent tampering therewith. The data may therefore be encrypted or encoded. When the data is received at the set top box the data may also be stored in a location of the memory that is non-accessible by the user.

As mentioned above, the satellite signal identifier may correspond to a market identifier, a transponder identifier or other type of identifier provided through the satellite communication system.

Figure 6:
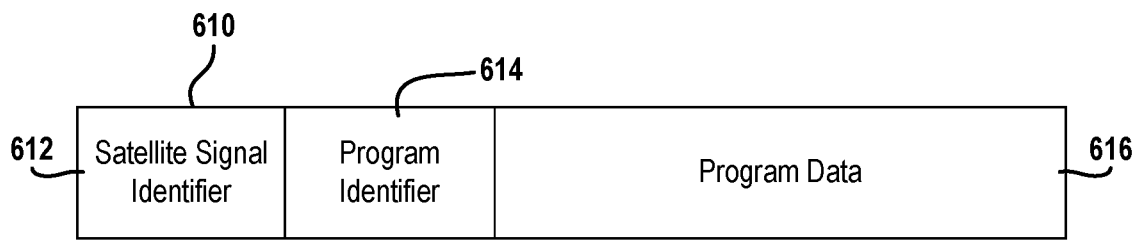
FIG. 6 is a diagram of a satellite signal having various data portions therein.

Referring now to FIG. 6, a simplified version of a satellite signal 610 is set forth. Each satellite signal 610 may include a satellite signal identifier 612. The satellite signal identifier 612 may include various types of identifiers including a transponder identifier, a channel identifier, a market identifier or other type of identifier. Such identifiers may be included in a programming guide list as well. Another type of identifier that may be included within the satellite signal is a program identifier 614 for identifying a specific program. The program identifier 614 may identify the specific program broadcasted on a particular signal from a particular transponder. Thus, by knowing the program identifier 614, the particular transponder corresponding to the program identifier may also be determined. A program data portion 616 may also be included within the satellite signal 610.

Figure 7:
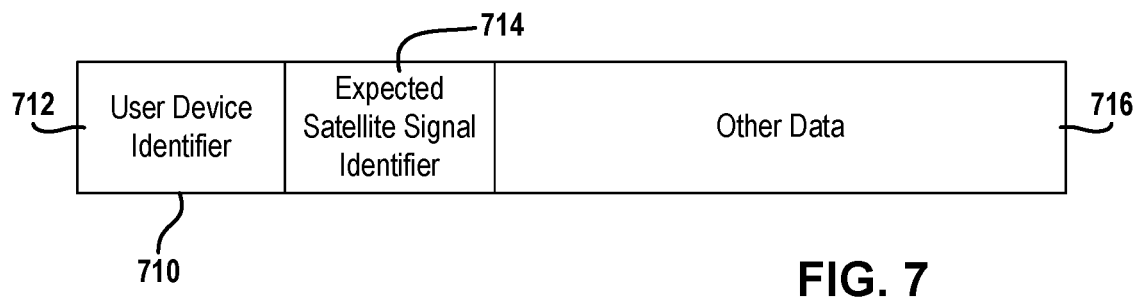
FIG. 7 is a diagrammatic view of a conditional access packet signal.

Referring now to FIG. 7, a conditional access packet signal 710 is set forth. The conditional access packet signal 710 includes a user device identifier 712. The user device identifier 712 may be generated for a specific user device. The user device identifier may also include a list of user devices should updates be necessary for user devices in a particular designated marketing area. The conditional access packet signal 710 may also include an expected satellite signal identifier. As mentioned above, the expected satellite signal identifier may include a transponder identifier or a market identifier. The expected satellite signal identifier 714 may include a plurality of expected satellite signal identifier associated with the particular user device location. Of course, other data 716 may also be included within the conditional access signal 716.

Referring now to FIG. 8, a method for operating the communication system is set forth. In step 810, the user device is registered with the head end. The user device may be activated and authorized by the head end and/or billing system upon initial use or configuration. Authorization may also be performed through an authorized dealer or on-site service technician. When setting up a user account, a service address for the user device is provided. The service address may correspond to a designated marketing area.

In step 812, a first expected satellite signal identifier is communicated to the user device. This may be performed using a conditional access packet signal, a data object or terrestrial network as described above. The first expected satellite signal identifier may correspond to the signals expected to be received at the user device from the particular designated marketing area or authorized location of the user device. The first expected satellite signal may correspond to market identifiers, spot beam identifiers or transponder identifiers. Other types of identifiers may also be communicated. The first expected satellite signal may be communicated in an encrypted manner. Further, an entire table of expected satellite signals for different regions may be communicated. However, only the designated marketing area expected satellite signals are required to be communicated. In step 814, the first expected satellite signal identifier is stored within the user device after being received.

In step 816, the satellite signals have unique satellite signal identifiers that are communicated by the satellite. Satellite beams have at least some type of identifier associated therewith in the program guide so that the set top box may tune to the desired transponder. The satellite signals themselves may also have satellite signal identifiers added thereto to allow the tuning thereof. In step 818, the satellite signals are communicated with the satellite signal identifiers to the user device. One or more satellites and one or more transponders may be used in the communication.

In step 820, the first (expected) satellite signal identifier and the second (received) satellite signal identifier are compared. Conversely, unexpected satellite signal identifiers may also be compared. In step 830, it is determined whether the first satellite signal identifier is equivalent to the second satellite signal identifier. In this manner, it is determined whether the expected satellite signal identifier is the same or comparable to the second received satellite signal identifier. It should be noted that more than one satellite signal identifier may be compared in this determination. For example, one location may expect signals from multiple transponders from different satellites. The beams corresponding to the transponders may include various spot beams. As mentioned above with respect to FIG. 2, different locations may have different expected signals. Further, signals not expected may also be used to determine an unauthorized location. When the first satellite signal identifier does not correspond to the second satellite signal identifier or unexpected signals are received, step 832 denies access to programming by disabling the user device from processing the satellite signals. Denial of access to programming may take place in different manners including the prevention of decrypting of the received program signal or disabling the tuner or other components. In step 834, a screen display may be generated that requires the user to call customer service to access programming that has been disabled since the geographic location of the set top box is improper.

Referring back to step 830, when the first satellite signal identifier corresponds to the second satellite signal identifier and/or no unexpected signals are received, step 836 allows access to the programming. As mentioned above, this method may take place at various times to ensure the set top box or user device is located in the proper geographic location.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
generating, from a satellite, a plurality of satellite spot beams that each provide digital content to a different fixed geographic region, each of the plurality of satellite spot beams comprising one of a plurality of different satellite signal identifiers;
receiving one of the satellite spot beams from the satellite comprising a first satellite signal identifier from the plurality of different satellite signal identifiers, said first satellite signal identifier comprising a first transponder identifier;
associating an expected satellite signal identifier with a billing location of a user device, said expected satellite signal identifier comprising a second transponder identifier;
communicating the expected satellite signal identifier to the user device through a terrestrial network;
storing the expected satellite signal identifier in a memory of the user device;
comparing, at a comparison module of the user device, the first satellite signal identifier to the expected satellite signal identifier to identify the first satellite signal as unexpected when the first satellite signal is not the expected satellite signal; and
disabling, at a disable module of the user device, the user device from processing the digital content in response to comparing.

2. The method as recited in claim 1 wherein generating the plurality of spot beams comprises generating each of the spot beams having a different satellite signal identifier associated therewith, associating the expected satellite signal identifier with one of the plurality of spot beams.

3. The method as recited in claim 1 wherein associating the expected satellite signal identifier comprises associating a designated marketing area with the location of the user device.

4. The method as recited in claim 1 wherein receiving the satellite signal from the satellite comprising the first satellite signal identifier comprises receiving the satellite signal from the satellite comprising a first market identifier and wherein associating the expected satellite signal identifier with the location of the user device comprises associating an expected market identifier with the location of the user device.

5. The method as recited in claim 1 wherein receiving the satellite signal from the satellite comprising the first satellite signal identifier comprises receiving the satellite signal from the satellite comprising a first transponder identifier and wherein associating the expected satellite signal identifier with the location of the user device comprises associating an expected transponder identifier with the location of the user device.

6. The method as recited in claim 1 wherein associating the expected satellite signal identifier with the location of the user device comprises associating the expected satellite signal identifier with an authorized location of a set top box.

7. The method as recited in claim 1 further comprising generating a screen display in response to comparing.

8. A user device comprising:
a satellite signal determination module receiving a first satellite beam from a satellite that generates a plurality of satellite beams that each provide digital content to a different fixed geographic region, each of the plurality of satellite beams comprising one of a plurality of different satellite signal identifiers;
said first satellite beam comprising a first satellite signal identifier, said first satellite signal identifier comprising a first transponder identifier;
an interface module receiving a expected satellite signal identifier through a network coupled to the user device, said expected satellite signal identifier determined from billing data of the head end, said second satellite signal identifier comprising a second transponder identifier;
a memory storing the expected satellite signal identifier for an authorized location of the user device;
a comparison module comparing the first satellite signal identifier to the expected satellite signal identifier to identify the first satellite signal as unexpected when the first satellite signal is not the expected satellite signal; and
a disable module disabling the user device from processing satellite signals in response to comparing.

9. The user device as recited in claim 8 wherein the first satellite signal identifier comprises a first market identifier and the expected satellite signal identifier comprises an expected market identifier.

10. The user device as recited in claim 8 wherein the first satellite signal identifier comprises a first transponder identifier and the expected satellite signal identifier comprises an expected transponder identifier.

11. A system comprising:
a user device as recited in claim 8; and
a head end.

12. The system as recited in claim 11 wherein the head end communicates the expected satellite signal identifier to a satellite television set top box through a terrestrial network.

13. The system as recited in claim 11 further comprising a satellite generating a plurality of spot beams and directing each of the spot beams to different geographic regions.

14. The system as recited in claim 13 wherein each of the spot beams having a different satellite signal identifier associated therewith.

15. The system of claim 11 further comprising a display associated with the user device, said user device generating a screen display on the display in response to comparing.

* * * * *